United States Patent Office 3,294,795
Patented Dec. 27, 1966

3,294,795
PROCESS FOR THE PREPARATION OF A STABLE COMPLEX OF BROMINE AND LACTAMS
Wiley Edgar Daniels, Easton, Pa., assignor to General Aniline & Film Corporation, New York, N.Y., a corporation of Delaware
No Drawing. Original application Apr. 27, 1962, Ser. No. 190,796, now Patent No. 3,174,980, dated Mar. 23, 1965. Divided and this application May 8, 1964, Ser. No. 366,160
4 Claims. (Cl. 260—247.7)

The present invention relates to a method of producing a novel, stable complex of bromine and certain lactams of 5-7 cyclic atoms, which have been found useful as solid compositions of matter capable of supplying free bromine for use in carrying out chemical reactions or as germicides or disinfectants.

While bromine has long been recognized as an effective germicide, fungicide, and disinfectant, its use for these purposes has been quite restricted because of its high corrosive toxic nature. I have now discovered that bromine can be complexed with lactams so as to produce novel compounds containing 32–36% available bromine, which are crystalline solid materials and which possess good storage stability.

Tafel and Wassmuth reported (Berichte, 1907, vol. 40, p. 2835) that 2-pyrrolidinone and bromine will react at approximately 0° C. in chloroform and formulated the reaction as follows:

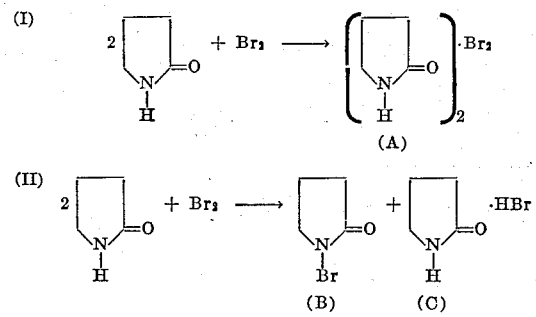

At ice temperatures, reaction I predominates and the product isolated is a mixture of compounds A and C above in such proportions that there is a 4.32% ionic bromide and 43.82% available bromine in the product. Product B remains in the filtrate and is lost. The thus obtained mixture of products A and C is quite unstable, gradually losing its available bromine content over a period of time, with a corresponding build-up of the ionic bromide. Thus after one month's storage of the above product, at room temperature, it was found to contain 11.76% ionic bromide and 35.52% available bromine. Such a product forms an unreliable source of bromine for carrying out reactions as a disinfectant, germicide, etc., since it would require analysis before each use to avoid use of greater amounts than necessary in order to compensate for deterioration.

As disclosed in my copending application Serial No. 190,796, filed April 27, 1962, now U.S. Patent No. 3,174,-980, of which the present application is a division, I have discovered that by reacting together 2-pyrrolidinone, hydrogen bromide, and bromine in alcoholic solutions and at molar ratios respectively of 3:1:1 and at a temperature of from 0° C. to 15° C., theer is obtained directly, and in excellent yield, a solid crystalline stable complex of bromine and 2-pyrrolidinone, having a melting point of 88–90° C. and containing approximately 32% available bromine (Br°) and approximately 16% ionic bromine (Br⁻).

In the case of other lactams a stable complex of the lactam and bromine is obtained in which the ratio of available or free bromine (Br°) to ionic bromide (Br⁻) is essentially 2:1 is provided, when the lactam, hydrogen bromide and bromine, are reacted pursuant to the present invention with respectively molar ratios 2:1:1. Such complexes in which the ratio Br°:Br⁻ is essentially 2, i.e. within the range of 2 to 2.3, have been found, like the above described complexes of bromine and 2-pyrrolidinone, to be stable on storage at ambient temperatures for periods exceeding 6 months, e.g. the ratio of Br°:Br⁻ does not vary beyond the limits of experimental error. The cyclic lactams which I have found form a stable complex with bromine when 2 molar proportions of the lactam are reacted with 1 molar proportion of bromine and 1 molar proportion of HBr in accordance with the present invention may be represented by the general formula

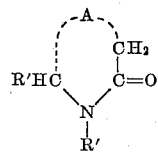

wherein the number of atoms in the cycle varies from 5–7 and where $A = (CH_2)_{n^2}(CH_2X)_{n^1}$,
$X = -NR''-, -O-, -S-, -SO_2-$,
$n^1 = 0$ or 1,
$n^2 = 2$ or 3 when $n^1$ is 0 and 1 or 2 when $n^1$ is 1,
$n^1 + n^2 = 1$, 2 or 3, and
R' and R'' represent hydrogen, alkyl or aryl,
$n^2 = 1$, 2 or 3 and is 2 or 3 when R' is hydrogen and $n^1$ is 0.

The preparation of such complexes is illustrated in the specific examples which follow. It has been found that with such lactams use of 3 molar proportions of the lactam with each molar proportion of HBr and bromine is unnecessary since the stable complex formed may be represented by the empirical formula of the product resulting from the reaction of 2 molar proportions of such a lactam with 1 molar proportion each of HBr and bromine even though a larger molar proportion such as 3 molar proportions of the lactam are used in the reaction.

*Example 1*

This example illustrates the preparation of an N-alkyl-lactam bromine complex by the process of this invention.

Anhydrous hydrogen bromide was passed into a glass cylinder containing 75 mls. of methanol cooled to 0° C. until
40.5 g. (0.5 mole) of HBr was absorbed. To this were added
26.0 mls. (0.5 mole) of bromine. This was transferred to a 600 ml. beaker and cooled in an ice bath. Addition of
99 mls. (1.0 mole) of N-methyl pyrrolidone was begun. The resulting mixture immediately deposited orange crystals. It was necessary to add
225 mls. of methanol to complete the addition. The final product was recrystallized from methanol to yield
191.6 g. of orange translucent crystals M.P. 122–124° C.

This represents a yield of product based on the formula $(C_5H_{10}NO)_2HBr_3$ of 87%, available bromine 36.3%, available bromine calculated from $(C_5H_{10})_2HBr_3$ 36.4%.

Another preparation of this product had the following elemental composition: C, 27.40%; Br⁻ 16.72%; Br°, 35.5%; Br total 53.70%. Calculated: C, 27.30%; Br⁻, 18.20%; Br°, 36.4%; Br total 54.00%.

*Example 2*

This example illustrates the preparation of a bromine complex of an oxygen analogue of a lactam, 3-morpholinone, by the process of this invention.

A solution of 40.5 g. anhydrous hydrogen bromide (0.5 mole) and
26.0 mls. (0.5 mole) of bromine in
75 mls. of methanol at 0° C. was added to a solution of
101 g. (1.0 mole) of 3-morpholinone in
1.0 l. of methanol at 0° C.

Long red-orange crystals formed immediately. These were filtered and dried to constant weight over KOH in vacuum. There was 121.5 g. of product obtained, M.P. 112–118° C., available bromine content 35.3%. Theoretical available bromine content for $(C_4H_7NO_2)_2 \cdot HBr \cdot Br_2$, 36.1%, when a ratio 3:1:1 of morpholinone, bromine and HBr is used a red oily material results.

*Example 3*

The complex of delta-valerolactam (piperidone) was prepared as in Example 2 to yield a product containing 33% available bromine.

While methanol was employed as the solvent in the foregoing examples, similar results have been obtained employing other lower primary aliphatic alcohols (alkanols) containing 1 to 4 carbon atoms, e.g. ethanol, 1-propanol, 1-butanol and isobutyl alcohol (2-methyl-1-propanol). However, secondary and tertiary alcohols, such as isopropyl alcohol, sec. butyl alcohol and tert. butyl alcohol are preferably avoided since they will react with the bromine and thus the concentration of HBr cannot be controlled, low bromide concentration would lead to an unstable product, while a high bromide concentration would not have any beneficial effect and would be wasted.

As examples of other lactams of the formula given above, whose bromine complexes may be prepared pursuant to the present invention may be mentioned gamma-valerolactam, 2-piperazinone, 4-thiazolidinone, 2-methyl-4-thiazolidinone, 3-thiamorpholinone, 2-phenyl-4-thiazolidinone, and 2-phenyl-4-thiazolidinone-1-dioxide.

It has been found that the novel product of the present invention can be diluted with inert solid materials so as to form dry, free-flowing powders, or if desired, the diluted material can be pressed into solids containing a predetermined amount of bromine. Suitable diluents for this purpose include kaolin, sodium sulfate, calcium silicate, aluminum silicate, and the like. When the material is to be pelleted, the incorporation of a small amount of polyvinylpyrrolidone would be advantageous to serve as a binder.

It will be recognized that the novel products of the present invention represent a safe and convenient way of "carrying" bromine and of particular advantage in applications where the use of elemental bromine might be hazardous or difficult. For example: as a germicide for swimming pools, where metering apparatus could be dispensed with; in oil well drilling to kill metal corroding bacteria; to kill weeds, mosquito larvae, etc.; for organic brominations in which elemental bromine is too active; as an analytical reagent in which bromine could be efficiently and accurately weighed out.

I claim:

1. The process of producing a solid crystalline stable complex of bromine and a cyclic lactam selected from the group consisting of N-methyl-2-pyrrolidone, 3-morpholinone piperidone, gamma-valerolactam, 2-piperazinone, 4-thiazolidinone, 2-methyl-3-thiazolidinone, 3-thiamorpholinone, 2-phenyl-4-thiazolidinone, and 2-phenyl-4-thiazolidinone-1-dioxide, which comprises reacting in solution in a primary lower alkanol having 1–4 carbon atoms and at a temperature of from 0–15° C. 2 molecular proportions of said cyclic amide with 1 molecular proportion of HBr and 1 molecular proportion of elemental bromine and recovering the thus formed complex of bromine and said cyclic lactam, said complex being characterized by its stability and a ratio of free bromine to ionic bromine of essentially 2:1.

2. The process as defined in claim 1 wherein the cyclic amide specified is N-methyl-2-pyrrolidone.

3. The process as defined in claim 1 wherein the cyclic amide specified is 3-morpholinone.

4. The process as defined in claim 1 wherein the cyclic amide specified is piperidone.

No references cited.

ALEX MAZEL, *Primary Examiner.*

JOSE TOVAR, *Assistant Examiner.*